(Model.)
L. SIMKINS.
FRUIT PICKER.
No. 268,950.  Patented Dec. 12, 1882.
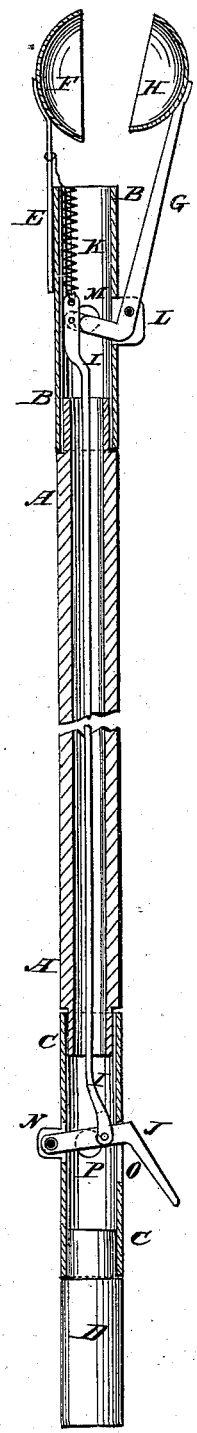
WITNESSES:
Francis McArdle
C. Sedgwick
INVENTOR:
L. Simkins
BY Munn & Co
ATTORNEYS.

UNITED STATES PATENT OFFICE.

LEBBEUS SIMKINS, OF MARSHFIELD, OREGON.

FRUIT-PICKER.

SPECIFICATION forming part of Letters Patent No. 268,950, dated December 12, 1882.

Application filed November 8, 1880. (Model.)

*To all whom it may concern:*

Be it known that I, LEBBEUS SIMKINS, of Marshfield, in the county of Coos and State of Oregon, have invented a new Improvement in Fruit-Pickers, of which the following is a specification.

The figure is a sectional elevation of my improvement.

The object of this invention is to furnish fruit-pickers so constructed as to permit the removal of the fruit from the tree without injuring it; and it consists in the peculiar construction and arrangement of parts, as hereinafter more fully set forth.

A represents a hollow pole of any desired length and having short tubes B C attached to its ends.

To the outer end of the lower tube, C, is attached a short handle, D. To one side of the upper end of the tube B is attached a short arm, E, to the upper end of which is attached a semi-spherical cup, F. To the upper end of a short lever, G, is attached a similar semi-spherical cup, H. The cups F H are made with sharp edges, and are so arranged that the edge of the one cup may overlap the edge of the other cup when the two cups are brought together, so as to cut off the stem of the fruit and receive the fruit within them. The lower part of the lever G is pivoted to lugs L, formed upon or attached to the side of the tube B, and its lower end is bent inward at right angles, passes through a slot in the side of the tube B, and to it is pivoted the upper end of a rod, I, which passes down through the cavity of the pole A and into the cavity of the lower tube, C, where it is pivoted to a lever, J.

The tube B is formed of a strip of sheet metal bent into tubular form and having its edges brazed together. The blank sheet for the tube B has lips cut upon its edges, and is slitted at the sides of the said lips, which lips are bent outward to form lugs L for the lever G to be pivoted to, and to serve as guides and supports to the said lever. In the opposite sides of the tube B are formed holes M, as shown in the figure, into which a pin is inserted when it is desired to lock the cup-cutters F H closed to protect their edges from being dulled. The lever J passes through slots in the opposite sides of the tube C, and its end is pivoted to lugs N, formed upon or attached to the said tube C. The other end of the lever J is bent downward along the side of the lower part of the tube C, so that it can be operated to bring the cup-cutters F H together by a hand holding the said tube C. The lugs N are formed in the same manner as hereinbefore described with reference to the lugs L. The lugs N, in connection with the slot O in the other side of the tube C, serve as guides to the lever J to hold it against lateral movement. In the opposite sides of the tube C are formed holes P, into which a pin may be inserted to lock the cup-cutters F H closed, when the implement is to be laid away or carried, to protect the edges of the said cutters from accidental injury. This construction allows the implement to be held by both hands, so that it can be readily guided and handled as required.

To the upper end of the rod I is attached the end of a spiral spring, K, the upper end of which is attached to the arm E, that carries the stationary cup F, so that when the lever J is released the elasticity of the spring K may raise the rod I and operate the lever G to withdraw the cup H from the cup F.

With this implement fruit may be picked from the outer and top limbs of a tree, where it could not be reached from a ladder or from the tree, and lowered to the ground or into a basket without being injured.

The implement may be made of any desired size, according to the size of the fruit to be picked.

I am aware that both the cups of a fruit-picker have heretofore been closed by means of a toggle-joint operated by a rod secured to its lower end, and both thrown open by means of a spring; and I am also aware that the cups of a fruit-picker have heretofore been secured to the upper ends of spring-arms, and that said cups have been closed by the action of a rod or cord and opened by the action of the spring-arms; and I am further aware that a fruit-picker consisting of hoops provided with flexible coverings, one of which hoops is stationary and the other closed upon it by means of a bent lever operated by a rod, and opened by the weight of the movable hoop, has heretofore been employed, and I therefore lay no claim to such constructions. In my invention the edges of the cup are sharp, so as to readily cut the stem of the fruit, and one cup is stationary and the other is movable, so as to give a shear-cut, and it requires less power and simpler mechanism than when both cups are operated.

Having thus described my invention, what I claim as new, and desire to secure by Letters Patent, is—

1. In a fruit-picker, the combination, with a hollow pole formed of the sections A B C, arm E, provided with the stationary cup F, and movable cup H, both cups having sharp edges, of the levers G J, connecting-rod I, and spring K, substantially as described, and for the purpose set forth.

2. In a fruit-picker, the combination, with the tubes B C, provided with the holes M P, adapted to receive locking-pins, stationary cup F, and movable cup H, of the levers G J and connecting-rod I, substantially as described, and for the purpose set forth.

LEBBEUS SIMKINS.

Witnesses:
T. G. OWEN,
A. D. MORSE.